G. CLAUDE.
PROCESS FOR THE EXTRACTION OF HYDROGEN FROM GASEOUS MIXTURES.
APPLICATION FILED MAR. 14, 1918.
1,395,389. Patented Nov. 1, 1921.
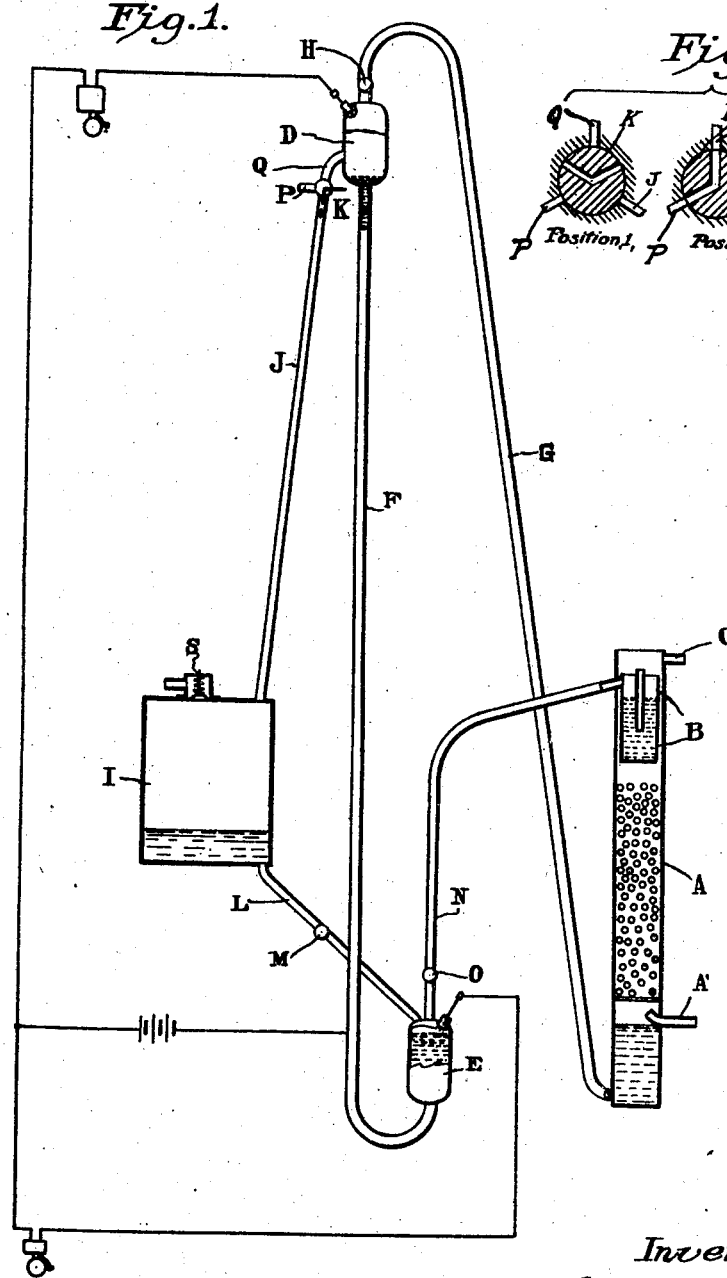
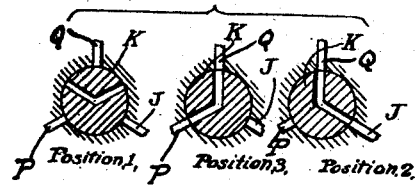
Inventor:
Georges Claude

UNITED STATES PATENT OFFICE.

GEORGES CLAUDE, OF PARIS, FRANCE, ASSIGNOR TO L'AIR LIQUIDE SOCIETE ANONYME POUR L'ETUDE ET L'EXPLOITATION DES PROCEDES GEORGES CLAUDE, OF PARIS, FRANCE.

PROCESS FOR THE EXTRACTION OF HYDROGEN FROM GASEOUS MIXTURES.

1,395,389.  Specification of Letters Patent.  Patented Nov. 1, 1921.

Application filed March 14, 1918. Serial No. 222,503.

*To all whom it may concern:*

Be it known that I, GEORGES CLAUDE, a citizen of France, residing at Paris, France, whose post-office address is 48 Rue street, Lazare, Paris, have invented a new and useful Improvement in Processes for the Extraction of Hydrogen from Gaseous Mixtures; and I do hereby declare the following to be a full, clear, and exact description of the same, such as will enable others skilled in the art to which it appertains to make and use the same, reference being had to the accompanying drawings and to the reference characters marked thereon, which form a part of the specification, and in which drawing the figure represents a view partly in side elevation and partly in section of an example of a device for carrying out my process.

This invention relates to the extraction and recovery of hydrogen from gaseous mixtures, particularly the hydrogen contained in water gas, coke oven gas, illuminating gas, etc., and has for its primary object the provision of a process whereby hydrogen may be produced in an economical and efficient manner.

The process involves the application of the dissolving properties of certain liquids for gases other than hydrogen to the separation and recovery of hydrogen from mixtures thereof with such other gases, the hydrogen being itself but slightly soluble in the liquids, and the liquids employed being such as will dissolve in a single stage all of the gases other than hydrogen, thus leaving the latter in a practically pure state. Consequently the process is carried out without the necessity of treating the same mass of gas in successive stages and in distinct operations for eliminating individually each of the gases other than hydrogen. Liquids satisfactory for the purpose, are, for example, methyl alcohol, ethyl alcohol, acetone, ethyl acetate, butyl acetate, benzin, etc.

In the practice of the invention the gaseous mixture under pressure, and a sufficient quantity of the liquid selected are caused to pass in opposite directions and in contact one with the other. During this contact all of the gases other than hydrogen are absorbed together with a small part of the hydrogen itself, so that the residual gas consists of pure hydrogen which escapes under pressure. The dissolved gases are subsequently separated when the liquid is released, for example, to atmospheric pressure and the liquid may be caused to pass through the same cycle continuously by again introducing it under the necessary pressure into the dissolving chamber. While the liquid may be released as stated, to atmospheric pressure to separate the dissolved gases, it is preferable, as hereinafter explained, to only partially release the pressure on the liquid With the highest pressures at present commercially employed (150 to 200 atmospheres), the process as outlined gives only mediocre results. This is explained by the fact that although hydrogen is of extremely low solubility in the liquids mentioned, the gases which accompany it (carbon monoxid, nitrogen, etc.,) are themselves but slightly soluble, even at 150 to 250 atmospheres. The coefficients of solubility in the most efficacious liquids hardly exceed with these gases 0.25. The coefficient of solubility above referred to is defined as the following ratio: as numerator the volume of gas dissolved, taken at the partial pressure of that gas in the compressed gaseous mixture, that pressure being calculated as assuming the gaseous mixture to follow the law of Mariotte-Boyle; as the denominator the volume taken at 15° C. and atmospheric pressure of the liquid in which the specified volume is gas is dissolved. Enormous quantities of the liquid in proportion to the volume of gases treated would, therefore, be necessary and the introduction of this liquid under the pressure prevailing in the dissolving chamber would necessitate a large expenditure of power, which, however, would be partly recoverable. Furthermore, the best solvents are in general, volatile, and when the liquid was released to the lower pressure, the dissolved gases liberated would be saturated with and would carry off the solvent as a vapor, thereby introducing serious loss which could not be avoided without difficulty.

The situation is, however, quite different when we contemplate pressures very much higher than those utilized to-day in the arts and which I have designated by the term "hyperpressures" in my application for Letters Patent of the United States, Serial No.

222,502, filed March 14, 1918, for improvements in the synthetic manufacture of ammonia. For gases so relatively insoluble as those now in question, even though their coefficient of solubility in the liquids is low, the quantity of gas dissolved increases almost proportionally to the pressure up to very high values of the latter without retardation of the progression by any action comparable to that which limits, at the ordinary temperature, the compressibility of the gases themselves. Consequently, the solvent liquid becomes capable of absorbing, per unit of volume, considerable quantities of gas, so that the volume of liquid employed in carrying out the process may be small in proportion to that of the gas treated. Accordingly the energy expended in introducing the liquid into the dissolving chamber is moderate as compared with the energy expended in compressing the gas to be treated, especially if the recovery of the energy is judiciously effected as hereinafter explained when the liquid is discharged from the dissolving chamber.

Furthermore, with the employment of hyperpressures (in the present case between 400 and 1,000 atmospheres), a very simple means can be employed for reducing to a quite negligible value, the losses of liquid due to volatilization. In fact the loss of volatile liquid in the gases given off is proportional to the ratio of its vapor tension to the total pressure. If the disengagement of the gases takes place at atmospheric pressure, the ratio will be large, for example, $\frac{3.5}{76}$ in the case of ethyl alcohol and at a temperature of 15° C. But if the disengagement of the dissolved gas is effected in a chamber where the pressure is maintained at P atmospheres, the ratio measuring the loss will become $\frac{3.5}{P \times 76}$, that is to say, P times less. Furthermore, if the solution of the gases is effected, as hereinbefore stated, at a hyperpressure (for example, 1,000 atmospheres), there will be no difficulty in bringing about the disengagement of the dissolved gases at a pressure P, still quite high (for example, 50 atmospheres), for the only resulting inconvenience will be that liquid reëntering the circuit will still contain the gas dissolved at a pressure of 50 atmospheres or $\frac{1}{20}$ of what the liquid will absorb under a pressure of 1,000 atmospheres. By this expedient, therefore, we reduce the loss of the dissolving liquid to about $\frac{1}{50}$, while its power of absorption is at the same time only reduced by 5%. Furthermore, the gases are thus delivered at a pressure of 50 atmospheres, appropriate to various applications to which they are adapted, for example, for motive power, for synthesis, etc. Obviously it is not possible to enjoy this latitude when working at much lower pressures. This liberation of the dissolved gases at a relatively high pressure is, therefore, an important characteristic of the invention.

As pointed out it is necessary to pay particular attention to the recovery of energy when the saturated liquid passes out of the dissolving chamber. The saturated liquid occupying, because of the presence of dissolved gas, a volume greater than the volume of the unsaturated liquid, provides theoretically an amount of energy greater than that necessary to return the liquid to the dissolving chamber even without taking account of the expansion of the dissolved gases when returning to the pressure of disengagements. We may, therefore, so arrange that the issuance of the saturated liquid furnishes the energy necessary for the introduction of the dissolving liquid to the dissolving chamber.

There is a classical method for accomplishing this result, viz: the use of a piston which is displaceable in a cylinder and upon one of the faces of which the saturated liquid acts for the purpose of forcing into the dissolving chamber the unsaturated liquid which enters and leaves the cylinder on the opposite side of the piston. A suitable arrangement of valves and pipes regulates and controls the admission and exhaustion of the liquids and external energy is supplied to make up the difference necessary because of mechanical losses and imperfections. Another expedient responding to the same end, will, however, be described hereinafter in its characteristic outlines, reference being made to the drawing in which Figure 1 is a diagrammatic illustration of an apparatus adapted to the operation of the process and Fig. 2 is a similar illustration of a valve, it being understood that the drawing is not intended to set forth the exact details of an apparatus, which obviously may be varied without departing from the invention.

In the drawing, A is a vertical purifying tower, or a dissolving chamber in which the gaseous mixture, preliminarily hypercompressed enters at the bottom at A′ and passes upwardly across suitable material such as plates, balls, quartz, or the like, while the solvent liquid, introduced periodically into the Mariotte bottle B, flows downwardly in contact with and in the opposite direction to the ascending gases. The separated hydrogen escapes continuously at the initial pressure through the pipe C.

A complementary arrangement has for its function, to withdraw in equal portions the liquid saturated by gas by the introduction of a corresponding quantity of unsaturated liquid. To this end, two receptacles D and E of a capacity equal to the desired volume of the successive charges of unsaturated liquid, are placed at a difference of level of several meters and are connected at their bottoms by a bent pipe F. The top of D is connected to the bottom of the tower A by a pipe G provided with a valve H. The bottom of D is connected to a reservoir I, for the disengagement of the dissolved gases, by a pipe J provided with a two-way valve K which permits communication between D and the atmosphere at will. The top of E is connected to the bottom of I by a pipe L provided with a valve M and to the Mariotte bottle B by a pipe N having a valve O. The gases disengaged in I issue therefrom at a constant pressure of 50 atmospheres, for example, through a valve S. The vessel E contains a quantity of mercury sufficient for the purpose as hereinafter described. Several phases in the operation of the valve K are illustrated in the drawing.

The mode of operation is as follows: The valve K being closed (position 1 of the drawing), we open the valve M; thus liquid is withdrawn from I under a pressure of 50 atmospheres into E and forces the mercury from E into the receptacle D which has previously been momentarily placed in communication with the atmosphere. An electric indicator controlled by a contact gives warning when the quantity of dissolving liquid in E is sufficient. We then close the valve M and open the valve O, then the valve H, the valve K remaining always in closed position. The dissolving pressure prevailing in the tower A is transmitted to each end of the mercury column in D and E, but because of the height of this column the pressure in E is greater than in D and a part of the saturated liquid from the bottom of A forces mercury from D and the dissolving liquid in E is carried into the Mariotte flask B. The closure of a circuit to an electric indicator gives warning when a sufficient amount of liquid has entered D. We then close the valves O and H and open K to position 2; the saturated liquid in D passes into the reservoir I and gives up the dissolved gas.

In moving the valve K to position 3, we place D for an instant in communication with a gasometer at ordinary atmospheric pressure, to release all pressure in D. We then close the valve K (position 1) and open the valve M to again commence the same operations, the succession of which can be continued indefinitely with the necessary rapidity to assure the purity of the hydrogen escaping from the tower.

It will be understood that all of these manipulations may be effected automatically so that through the intervention of the Mariotte bottle, a continuous and constant current of liquid will circulate in A and a continuous current of recovered hydrogen will issue at C.

The process constituting the subject of the present invention as will be understood, is especially advantageous when the hydrogen is to be employed at the same hyperpressure as serves for its recovery.

What I claim is:

1. The process of extracting hydrogen from gaseous mixtures containing it, which comprises compressing the mixture to a pressure within the range of 400 to 1,000 atmospheres, and circulating the mixture in contact with a solvent liquid which will dissolve, in a single stage, all of the gases except the hydrogen, thus leaving the latter in a practically pure and compressed state.

2. The process of extracting hydrogen from gaseous mixtures containing it, which comprises compressing the mixture to a pressure within the range of 400 to 1,000 atmospheres, circulating the mixture in contact with a solvent liquid which will dissolve, in a single stage, all of the gases except the hydrogen, thus leaving the latter in a practically pure and compressed state, and releasing pressure on the liquid to discharge the dissolved gases.

3. The process of extracting hydrogen from gaseous mixtures containing it, which comprises circulating the mixture, under pressure, in contact with a solvent liquid which will dissolve, in a single stage, all of the gases other than the hydrogen, leaving the latter in a practically pure and compressed state and then relieving the saturated liquid of the dissolved gases at a pressure intermediate between the pressure of initial compression and atmospheric pressure.

4. The process of extracting hydrogen from gaseous mixtures containing it, which comprises circulating the mixture, under pressure, in contact with a solvent liquid which will dissolve, in a single stage, all of the gases other than the hydrogen, leaving the latter in a practically pure and compressed state, then relieving the saturated liquid of the dissolved gases at a pressure intermediate between the pressure of initial compression and atmospheric pressure, and then returning the liquid into the contact inclosure at the initial pressure by means of the energy produced by the passage of said liquid from the initial pressure to the intermediate pressure referred to.

GEORGES CLAUDE.